Oct. 18, 1955 J. M. NISSEN 2,721,102

AGRICULTURAL SPRAYER

Filed June 25, 1953 2 Sheets-Sheet 1

James M. Nissen
INVENTOR.

BY Clarence A. O'Brien
and Harvey B. Jacobson
Attorneys

AGRICULTURAL SPRAYER

Filed June 25, 1953 2 Sheets-Sheet 2

James M. Nissen
INVENTOR.

BY Clarence A. O'Brien and Harvey B. Jacobson
Attorneys

United States Patent Office 2,721,102

Patented Oct. 18, 1955

1

2,721,102

AGRICULTURAL SPRAYER

James M. Nissen, San Jose, Calif.

Application June 25, 1953, Serial No. 364,144

8 Claims. (Cl. 299—38)

This invention relates to a spray nozzle and particularly to a nozzle to be mounted on an airplane for dispensing droplets of spray material for agricultural spraying.

In agricultural spraying, many types of nozzles have been employed for securing a substantially even distribution of the spray material over the relatively large area of agricultural land. Considerable difficulty has heretofore been encountered because of clogging or so-called freezing of the spray nozzles. Heretofore, most of the spray nozzles have been relatively small apertured and operated under pressure so that any tendency of the mix to clog would block up the nozzle and prevent proper operation thereof. Rotary nozzles as heretofore known have been quite complicated and hard to clean and maintain in operative condition. Also, such nozzles have produced as high drag, so that only a few nozzles could be used thus reducing the area that could be covered at each pass. The high drag also adversely affects the performance of the airplane to the extent that it limits the load of spray carried by the airplane.

The present invention provides a spray nozzle with a quick disconnect fitting, and a relatively large delivery pipe so that the mixture or liquid may flow freely therein by gravity and utilizes an impeller blade mounted adjacent the outlet of the discharge pipe for breaking the discharge up into a plurality of small droplets and dispensing the same into the air stream radially with respect to the nozzle at high velocity which further breaks up the liquid into smaller droplets. Preferably, the impeller blade is shielded by a conical or ogive type nose having a base diameter substantially equal to the outer diameter of the impeller and having a stream-lined after body or tail mounted immediately behind the impeller so that the air flow over the nozzle and the tail produces a suction in the slot between the nose and the after body to assist the impeller in removing the material discharged from the pipe. The impeller itself may be driven in any suitable way, but is preferably driven by means of air propeller blades mounted on or attached to the impeller blade and extending radially therefrom into the air stream around the shield. The rotating blades also help to break up the liquid into smaller droplets.

It is accordingly an object of the invention to provide an improved nozzle.

It is a further object of the invention to provide a nozzle having a relatively large discharge pipe.

It is a further object of the invention to provide a nozzle having an impeller for distributing the liquid material.

It is a further object of the invention to provide a spray nozzle having a low drag when mounted on an airplane.

It is a further object of the invention to provide a nozzle having a relatively large annular discharge orifice.

It is another object of the invention to provide a nozzle attached by means of a quick disconnect coupling.

It is a still further object of the invention to provide a nozzle having a rotary impeller with a propeller attached.

It is another object of the invention to provide a nozzle adapted to utilize a plurality of types of interchangeable impellers.

2

Other objects and many of the attendant advantages of the present invention will be apparent from the following detailed description taken in conjunction with the accompanying drawing, in which.

Figure 1:
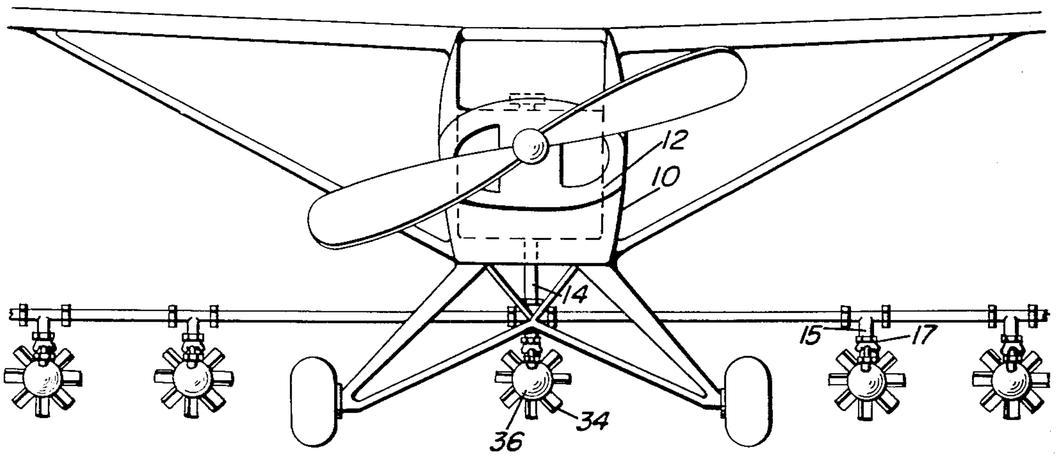
Figure 1 is a front elevation of a portion of a spraying airplane showing the nozzle attached thereto.
Figure 2:
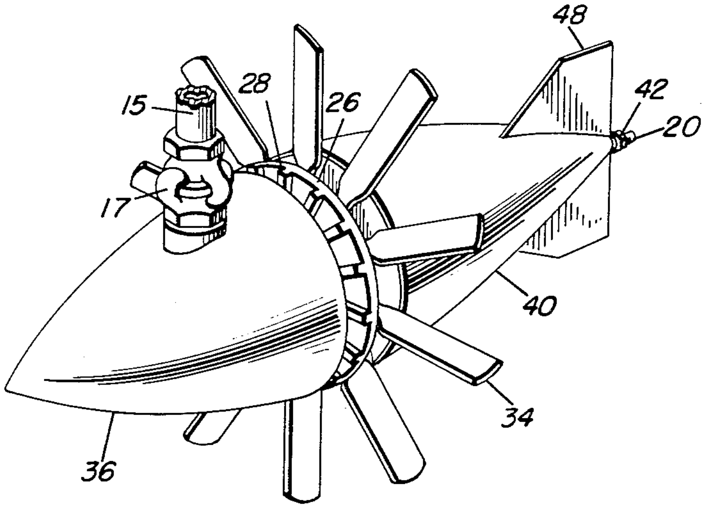
Figure 2 is a perspective view of the nozzle.
Figures 3, 4, 5:
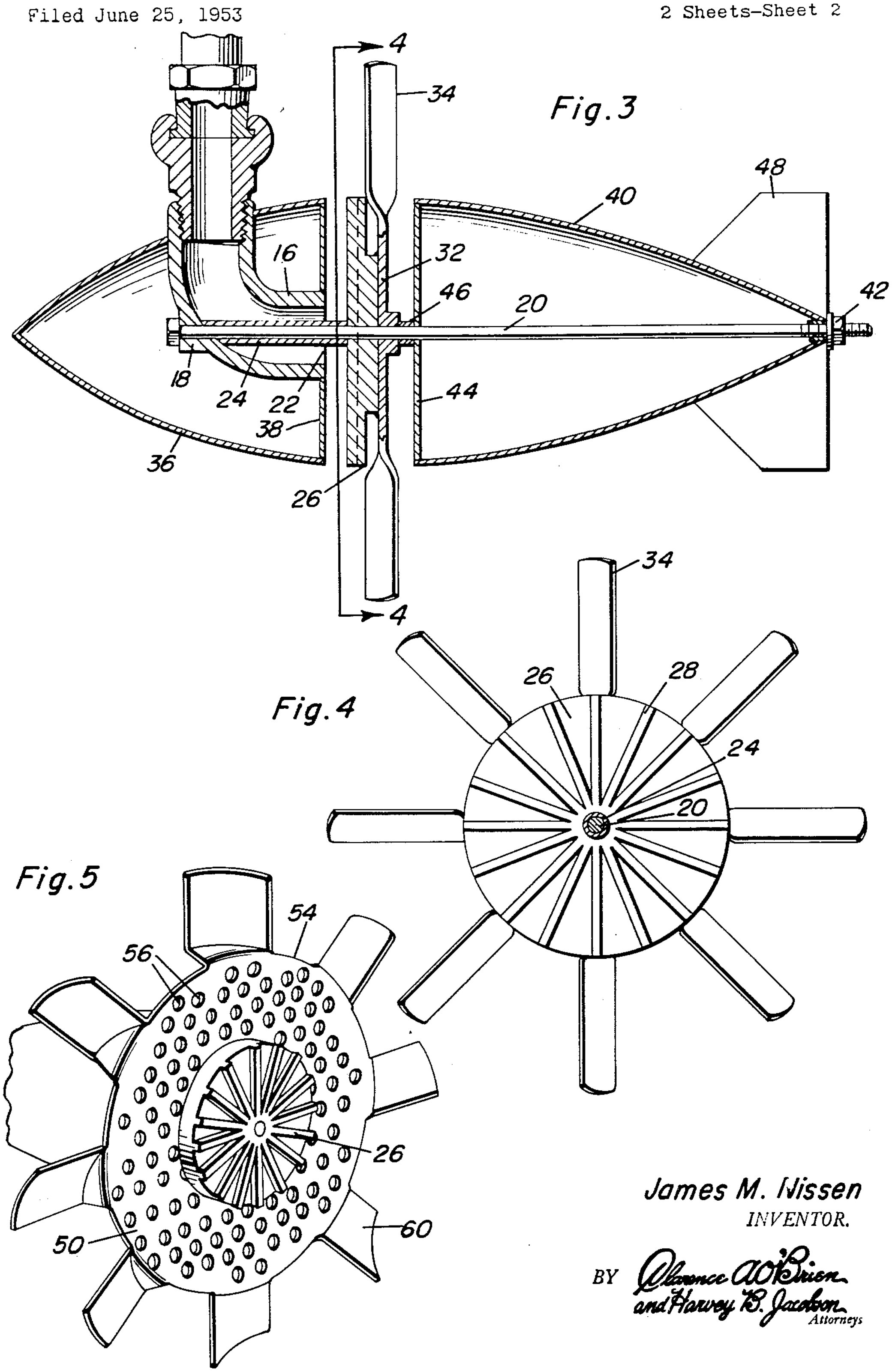
Figure 3 is a longitudinal vertical elevation through the nozzle.
Figure 4 is a plan view of a simplified impeller according to the invention.
Figure 5 is a perspective view of a modification of the impeller according to the invention.

In the exemplary embodiment according to the invention, an agricultural spray airplane 10 of any desired type carries a tank of spray liquid indicated generally at 12 and has a discharge pipe 14 which may be provided with any suitable valve for allowing the liquid or mixture in the tank 12 to flow by gravity through the pipe 14. The pipe 14 terminates in a header 15 to which a plurality of L-shaped discharge terminals 16 are connected by quick acting couplings 17. The discharge terminal portions 16 extend rearwardly when the nozzles are mounted on the header 15. A boss 18 is provided in the L-shaped portion 16 and an axle 20 is rigidly mounted therein and extends substantially axially through the annular orifice 22 at the discharge end of the portion 16.

A sleeve 24 is preferably rigidly attached to the interior of the portion 16 so that the axle 20 extends therethrough. The open end of the L-shaped portion 16 and the sleeve 24 defines an annular orifice for discharge of liquid onto an impeller disk 26. The impeller disk 26 is journaled on the axle 20 and is spaced rearwardly from the annular orifice 22 by means of the sleeve 24. A forward side of the disk 26 is provided with a plurality of impeller ribs 28 herein shown as substantially radial, although it is apparent that the ribs 28 may extend at an angle with respect to their radial direction, or they may be curved, to provide flingers.

An aerial propeller herein shown as a disk 32 welded or otherwise attached to the plate 26 is provided with radially extending blades 34 which may be of any desired shape or angle of inclination. A stream-lined shield 36 extends forwardly and substantially encloses the terminal portion of the part 16 and is preferably of a substantially conical or ogive shape so as to provide a steady air flow thereover. The base 38 of the nose 36 is substantially flush with the orifice 22 and is of substantially equal diameter with the impeller disk 26.

A substantially stream-lined or inversely ogive after body 40 is mounted on the axle 20 and secured thereon by means of a fastener such as the nut 42. The forward end 44 of the after body 40 is spaced from the propeller disk 32 by means of a spacer block 46 and the forward end 44 of the tail is substantially identical in diameter to the rear end 38 of the ogive nose 36.

The after body 40 may be provided with suitable stabilizing fins 48.

In addition to varying the number and the pitch of the ribs 28, a perforated disk 50 may be mounted on the impeller disk 26 and is preferably circular in form and larger in diameter than said impeller disk 26. The outer perimeter 54 will then extend beyond the extremity of the impeller disk 26 and the propeller blades 60 are mounted at the periphery of the disk 50. A plurality of apertures 56 are provided in the disk 50 to catch the liquid distributed by the impeller 26 and break it up into fine droplets. The number and size of the apertures 56 will be determined by the viscosity of the liquid and the size of the droplets to be distributed.

In the operation of the device according to the invention, a valve will be opened to allow the material to be sprayed to fall by gravity through the discharge pipe 14 where it will be discharged onto the impeller disk 26. Because of the suction of the air stream over the nose 36, a suction will be formed causing the material to flow rapidly out of the part 16 onto the impeller blade and axially outwardly therefrom. The rotation of the impeller disk at high speed throws the liquid out radially with a high velocity which will break the liquid up into a plurality of fine drops which will be radially distributed around the impeller so that a relatively large crop area may be covered. At the termination of the spraying run, valves (not shown) in the header 15 will be closed and because of the suction in the transverse slot between the nose and the after body, material in the part 16 will be rapidly drawn onto the impeller so that there will be a sharp cut-off of spraying material so that there will be no carry-over into adjoining fields.

Tail piece 40 may be readily removed by removing the nut 42 so that various types of impellers may be readily assembled in the device according to the size of the droplets desired or the viscosity of the liquid to be dispensed.

Because of the ogive nose type and the stream-lined after body, the nose 36 and the after body 40 provide a substantially elongated, stream-lined shield of relatively small weight and having a low drag with respect to the plane on which it is mounted.

While for the purpose of exemplification, a presently preferred embodiment of the invention has been shown and described according to the best present understanding thereof, it will be apparent to those skilled in the art that many changes and modifications may be made in the construction and arrangement of the parts thereof without departing from the true spirit and purpose of the invention.

What is claimed as new is as follows:

1. A spray nozzle comprising a discharge pipe, an axle mounted in said pipe and extending therefrom, an impeller journaled on said axle adjacent the open end of said pipe, propeller blades attached to and extending substantially radially from said impeller, a substantially conical nose mounted on said pipe, said nose extending substantially coaxially with said impeller, a substantially stream-lined tail mounted on said axle and extending rearwardly from said impeller, said nose and said tail forming a substantially stream-lined shield about said impeller, said shield having a maximum diameter substantially equal with the diameter of said impeller, said impeller including a substantially plane disk, a plurality of substantially radial ribs on said disk.

2. A spray nozzle comprising a discharge pipe, an axle mounted in said pipe and extending therefrom, an impeller journaled on said axle adjacent the open end of said pipe, propeller blades attached to and extending substantially radially from said impeller, a substantially conical nose mounted on said pipe, said nose extending substantially coaxially with said impeller, a substantially stream-lined tail mounted on said axle and extending rearwardly from said impeller, said nose and said tail forming a substantially stream-lined shield about said impeller, said shield having a maximum diameter substantially equal with the diameter of said impeller, said impeller including a substantially plane disk, a plurality of substantially radial ribs on said disk, an annular plate mounted on said impeller, said plate having a plurality of apertures therein.

3. A spray nozzle comprising a discharge pipe, said pipe terminating in a rearwardly directed terminal portion, an axle mounted substantially axially of said terminal portion and extending rearwardly therefrom, a substantially circular impeller disk journaled on said axle adjacent the end of said terminal portion, a plurality of substantially radially disposed ribs on the face of said disk, an ogive nose mounted on said pipe substantially coaxial with said terminal portion, the rear of said nose being substantially flush with the end of said pipe, propeller blades attached in driving relation with said impeller.

4. A spray nozzle comprising a discharge pipe, said pipe terminating in a rearwardly directed terminal portion, an axle mounted substantially axially of said terminal portion and extending rearwardly therefrom, a substantially circular impeller disk journaled on said axle adjacent the end of said terminal portion, a plurality of substantially radially disposed ribs on the face of said disk, an ogive nose mounted on said pipe substantially coaxial with said terminal portion, the rear of said nose being substantially flush with the end of said pipe, propeller blades attached in driving relation with said impeller, an annular plate mounted on said impeller, said plate having a plurality of apertures therein.

5. A spray nozzle comprising a discharge pipe, said pipe terminating in a rearwardly directed terminal portion, an axle mounted substantially axially of said terminal portion and extending rearwardly therefrom, a substantially circular impeller disk journaled on said axle adjacent the end of said terminal portion, a plurality of substantially radially disposed ribs on the face of said disk, an ogive nose mounted on said pipe substantially coaxial with said terminal portion, the rear of said nose being substantially flush with the end of said pipe, propeller blades attached in driving relation with said impeller, a substantially streamlined tail mounted on said axle, the forward end of said tail being spaced from said nose to provide a transverse slot receiving said impeller.

6. A spray nozzle for mounting on an airplane for movement through the air to spray liquid into the air comprising a pair of horizontal coaxial front and rear hollow sections having spaced confronting ends forming a slot therebetween, a gravity feed liquid discharge pipe depending into said front section and having a discharge end in the axis of said front section opening rearwardly into said slot to discharge liquid into the slot, an axial shaft in said sections traversing said slot, a rotary disk on said shaft and in said slot spaced from said end of the front section and against which liquid from said discharge end is adapted to impinge, radial front impeller blades on said disk terminating at the periphery thereof for breaking up liquid into spray form and broadcasting the same into the air under the action of centrifugal force caused by rotation of the blades by said disk, and propeller blades on said disk extending radially outwardly therefrom for operation by travel through the air to rotate said disk, said front and rear sections being of ogive streamlined form and said disk lying within the confines of said slot so that under forward movement of the nozzle through the air, suction will be induced in the slot between said front section and disk to cause the discharging liquid to impinge against the disk.

7. A spray nozzle according to claim 6, said front section being supported by said pipe and said shaft being supported by said pipe and supporting said rear section.

8. A spray nozzle according to claim 6, said pipe being L-shaped with one end extending upwardly out of said front section, and a coupling on said one end of the pipe for attaching the same to a liquid supply.

References Cited in the file of this patent

UNITED STATES PATENTS

| | | |
|---|---|---|
| 538,008 | Burns | Apr. 23, 1895 |
| 768,618 | Newmeyer | Aug. 30, 1904 |
| 1,562,251 | Pelton | Nov. 17, 1925 |
| 1,835,970 | Savage | Dec. 8, 1931 |
| 2,048,847 | Desmet | July 28, 1936 |
| 2,098,887 | Satterlee | Nov. 9, 1937 |
| 2,441,565 | Corwin | May 18, 1948 |
| 2,448,472 | Schott | Aug. 31, 1948 |
| 2,488,554 | Offerson | Nov. 22, 1949 |
| 2,537,251 | Wilson | Jan. 9, 1951 |